(12) United States Patent
Poore et al.

(10) Patent No.: US 11,740,316 B2
(45) Date of Patent: Aug. 29, 2023

(54) HEAD-MOUNTABLE DEVICE WITH INDICATORS

(71) Applicant: Apple Inc., Cupertino, CA (US)

(72) Inventors: Killian J. Poore, Santa Clara, CA (US); Stephen E. Dey, San Francisco, CA (US); Trevor J. Ness, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/935,052

(22) Filed: Jul. 21, 2020

(65) Prior Publication Data

US 2021/0055367 A1    Feb. 25, 2021

Related U.S. Application Data

(60) Provisional application No. 62/889,473, filed on Aug. 20, 2019.

(51) Int. Cl.
*G06F 3/01* (2006.01)
*G01S 3/808* (2006.01)
*G02B 27/01* (2006.01)

(52) U.S. Cl.
CPC ........ *G01S 3/8083* (2013.01); *G02B 27/0176* (2013.01); *G06F 3/013* (2013.01); *G02B 27/0172* (2013.01)

(58) Field of Classification Search
CPC .......... G06F 3/011–015; G06F 2111/18; G06F 3/013
See application file for complete search history.

(56) References Cited

U.S. PATENT DOCUMENTS

| | | | |
|---|---|---|---|
| 8,150,063 B2 | 4/2012 | Chen et al. |
| 8,493,204 B2 | 7/2013 | Wong et al. |
| 9,348,144 B2 | 5/2016 | Kobayashi |
| 9,998,847 B2 | 6/2018 | Norris et al. |

(Continued)

FOREIGN PATENT DOCUMENTS

| | | |
|---|---|---|
| CN | 102543099 | 7/2012 |
| CN | 103946733 | 7/2014 |

(Continued)

OTHER PUBLICATIONS

Chinese Office Action from Chinese Patent Application No. 202010464844.7, dated Jun. 22, 2002, 17 pages including machine-generated English language translation.

(Continued)

*Primary Examiner* — Sanghyuk Park
(74) *Attorney, Agent, or Firm* — BakerHostetler (57) ABSTRACT

A head-mountable device can include multiple microphones for directional audio detection. The head-mountable device can also include a speaker for audio output and/or a display for visual output. The head-mountable device can be configured to provide visual outputs based on audio inputs by displaying an indicator on a display based on a location of a source of a sound. The head-mountable device can be configured to audio outputs based on audio inputs by modifying an audio output of the speaker based on a detected sound and a target characteristic. Such characteristics can be based on a direction of a gaze of the user, as detected by an eye sensor.

20 Claims, 4 Drawing Sheets

(56) References Cited

U.S. PATENT DOCUMENTS

| | | | |
|---|---|---|---|
| 10,088,868 B1 | 10/2018 | Hernandez Garcia et al. | |
| 10,684,485 B2 | 6/2020 | Stafford et al. | |
| 11,055,533 B1* | 7/2021 | Scott, II | G06F 3/013 |
| 2014/0375683 A1* | 12/2014 | Salter | G02B 27/0172 |
| | | | 345/633 |
| 2015/0016641 A1* | 1/2015 | Ugur | G06F 3/167 |
| | | | 381/303 |
| 2016/0080874 A1 | 3/2016 | Fullam | |
| 2016/0212538 A1* | 7/2016 | Fullam | H04R 29/001 |
| 2017/0345408 A1 | 11/2017 | Hong et al. | |
| 2018/0164588 A1* | 6/2018 | Leppanen | G06F 3/016 |
| 2019/0306651 A1* | 10/2019 | Vilermo | G06F 3/0346 |

FOREIGN PATENT DOCUMENTS

| | | |
|---|---|---|
| CN | 105073073 | 11/2015 |
| CN | 105378625 | 3/2016 |
| CN | 106062746 | 10/2016 |
| CN | 107438209 | 12/2017 |
| CN | 109313911 | 2/2019 |
| CN | 109686367 | 4/2019 |
| WO | WO 2015/103578 | 7/2015 |

OTHER PUBLICATIONS

Chinese Office Action from Chinese Patent Application No. 202010464844.7, dated Dec. 12, 2002, 17 pages including English language translation.

Chinese Office Action from Chinese Patent Application No. 202010464844.7, dated Mar. 11, 2023, 26 pages including English language translation.

* cited by examiner

HEAD-MOUNTABLE DEVICE WITH INDICATORS

CROSS-REFERENCE TO RELATED APPLICATION

This application claims the benefit of U.S. Provisional Application No. 62/889,473, entitled "AUDIO-BASED FEEDBACK FOR HEAD-MOUNTABLE DEVICE," filed Aug. 20, 2019, the entirety of which is incorporated herein by reference.

TECHNICAL FIELD

The present description relates generally to head-mountable devices, and, more particularly, to audio-based feedback for head-mountable devices.

BACKGROUND

A head-mountable device can be worn by a user to display visual information within the field-of-view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. A head-mountable device can capture various types of inputs (e.g., visual, audio, tactile, etc.) from an environment and/or the user. A head-mountable device can also provide various types of outputs (e.g., visual, audio, tactile, etc.) to a user and/or the environment.

In particular, a head-mountable device can be provided with multiple microphones for capturing audio information (e.g., sounds) from multiple sources that are located in different directions with respect to the head-mountable device. Multiple microphones distributed across the head-mountable device can provide directional audio detection. The head-mountable device can use the data collected by the microphones to provide visual and/or audio outputs to the user. For example, the detected audio inputs can be rendered with visual outputs by providing indicators directing the user to the source of the sound. This can allow the user to correctly and readily identify the location of the source, even when the user is not readily able to hear the sound independently of the head-mountable device. By further example, the detected audio inputs can be rendered with audio outputs that emphasize (e.g., amplify) certain sounds over others to help the user distinguish between different sounds.

Systems of the present disclosure can include a head-mountable device with multiple microphones. The head-mountable device can also include a speaker for audio output and/or a display for visual output. The head-mountable device can be configured to provide visual outputs based on audio inputs by displaying an indicator on a display based on a location of a source of a sound. The head-mountable device can be configured to audio outputs based on audio inputs by modifying an audio output of the speaker based on a detected sound and a target characteristic. Such characteristics can be based on a direction of a gaze of the user, as detected by an eye sensor.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
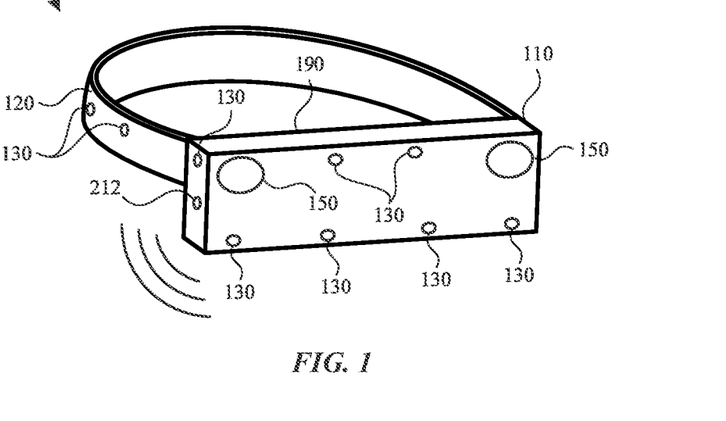
FIG. 1 illustrates a perspective view of a head-mountable device on a user, according to some embodiments of the present disclosure.

According to some embodiments, for example as shown in FIG. 1, a head-mountable device 100 includes a frame 110 that is worn on a head of a user. The frame 110 can be positioned in front of the eyes of a user to provide information within a field-of-view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120.

The head-mountable device 100 can include multiple microphones 130 distributed on the frame 110 and/or the securement element 120. The microphones 130 can be spatially distributed evenly or unevenly. The microphones 130 can be positioned at various portions, such as on a front, rear, left, right, top, and/or bottom side of the head-mountable device 100 (e.g., including the frame 110 and/or the securement element 120). The microphones 130 can be omnidirectional or directional. Detection of sound source direction can be performed with one or more of a variety of microphone types, as discussed further herein.

One or more of the microphones 130 can be or include a directional microphone that is configured to be most sensitive to sound in a particular direction. Such directionality can be provided based on structural features of the microphone 130 and/or surrounding structures. For example, one or more of the microphones 130 can include or be adjacent to a parabolic reflector that collects and focuses sound waves from a particular direction onto a transducer. Based on the known directionality relative to other portions of the head-mountable device 100, sound received by such a microphone 130 can be attributed to a source in a particular direction with respect to the head-mountable device 100. Different microphones 130 can be oriented with different directionalities to provide an array of coverage that captures sounds from a variety of (e.g., all) directions.

An array of multiple microphones can be operated to isolate a sound source and reject ambient noise and reverberation. For example, multiple microphones can be operated to perform beamforming by combining sounds from two or more microphones to allow preferential capture of sounds coming from certain directions. In a delay-and-sum beamformer, sounds from each microphone are delayed relative to sounds from the other microphones, and the delayed signals are added. The amount of delay determines the beam angle (e.g., the angle in which the array preferentially "listens"). When a sound arrives from this angle, the sound signals from the multiple phones are added constructively. The resulting sum is stronger, and the sound is received relatively well. When a sound arrives from another angle, the delayed signals from the various microphones add destructively (e.g., with positive and negative parts of the sound waves canceling out to some degree) and the sum is not as loud as an equivalent sound arriving from the beam angle. For example, if a sound arrives at a microphone on the right before it enters a microphone on the left, then it can be determined that the sound source is to the right of the microphone array. During sound capturing, a controller (e.g., processor) can "aim" a capturing beam in a direction of the sound source. Beamforming allows a microphone array to simulate a directional microphone pointing toward the sound source. The directivity of the microphone array reduces the amount of captured ambient noises and reverberated sound as compared to a single microphone. This may provide a clearer representation of a sound source. A beamforming microphone array may made up of distributed omnidirectional microphones linked to a processor that combines the several inputs into an output with a coherent form. Arrays may be formed using numbers of closely spaced microphones. Given a fixed physical relationship in space between the different individual microphone transducer array elements, simultaneous digital signal processor (DSP) processing of the signals from each of the individual microphones in the array can create one or more "virtual" microphones.

The head-mountable device 100 can include one or more speakers 212. Where multiple speakers are provided, the speakers can be directed to each of a user's ears to provide stereo sound. Other speaker arrangements are contemplated, including surround sound. Additionally or alternatively, the head-mountable device 100 can be operably connected to speakers that are directed to, near, or in a user's ears.

The frame 110 can include and/or support a display 190 that provides visual output for viewing by a user wearing the head-mountable device 100. For example, one or more optical modules can each provide a display 190 that is positioned on an inner side of the frame 110. As used herein, an inner side of a portion of a head-mountable device is a side that faces toward the user and/or away from the external environment. For example, a pair of optical modules can be provided, where each optical module is movably positioned to be within the field-of-view of each of a user's two eyes. Each optical module can be adjusted to align with a corresponding eye of the user. For example, each optical module can be moved along one or more axes until a center of each optical module is aligned with a center of the corresponding eye. Accordingly, the distance between the optical modules can be set based on an interpupillary distance of the user.

The frame 110 can include and/or support one or more cameras 150. The cameras 150 can be positioned on or near an outer side of the frame 110 to capture images of views external to the head-mountable device 100. As used herein, an outer side of a portion of a head-mountable device is a side that faces away from the user and/or towards an external environment. The captured images can be visually output by the display 190 to the user and/or stored for any other purpose. Accordingly, the display 190 is able to accurately reproduce, simulate, or augment a view based on a view captured by the camera 150.

The display 190 and accompanying components can transmit light from a physical environment (e.g., as captured by the camera 150) for viewing by the user. Such a display 190 and/or accompanying components can include optical properties, such as lenses for vision correction based on incoming light from the physical environment. Additionally or alternatively, a display 190 can provide information within a field-of-view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different from the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
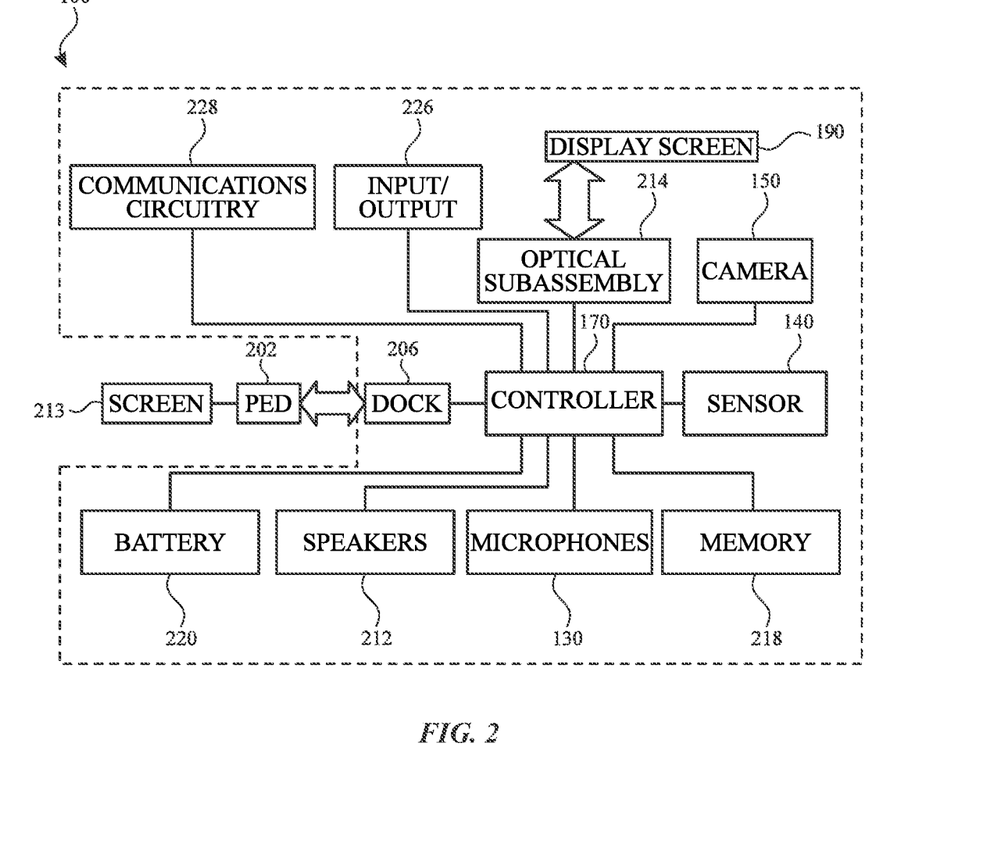
FIG. 2 illustrates a block diagram of a head-mountable device, in accordance with some embodiments of the present disclosure.

Referring now to FIG. 2, components of the head-mountable device can be operably connected to provide the performance described herein. FIG. 2 shows a simplified block diagram of an illustrative head-mountable device 100 in accordance with one embodiment of the invention. It will be appreciated that components described herein can be provided on either or both of a frame and/or a securement element of the head-mountable device 100.

As shown in FIG. 2, the head-mountable device 100 can include a controller 270 with one or more processing units that include or are configured to access a memory 218 having instructions stored thereon. The instructions or computer programs may be configured to perform one or more of the operations or functions described with respect to the head-mountable device 100. The controller 270 can be implemented as any electronic device capable of processing, receiving, or transmitting data or instructions. For example, the controller 270 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mountable device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mountable device 100 can further include a display 190 for displaying visual information for a user. The display 190 can provide visual (e.g., image or video) output. The display 190 can be or include an opaque, transparent, and/or translucent display. The display 190 may have a transparent or translucent medium through which light representative of images is directed to a user's eyes. The display 190 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly 214 configured to help optically adjust and correctly project the image based content being displayed by the display 190 for close up viewing. The optical subassembly 214 can include one or more lenses, mirrors, or other optical devices.

The head-mountable device 100 can include a camera 150 for capturing a view of an environment external to the head-mountable device 100. The camera 150 can include an optical sensor, such as a photodiode or a photodiode array. Additionally or alternatively, the camera 150 can include one or more of various types of optical sensors that are arranged in various configurations for detecting user inputs described herein. The camera 150 may be configured to capture an image of a scene or subject located within a field-of-view of the camera 150. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 100 can include one or more sensors 140 (e.g., eye sensor) for tracking features of the user wearing the head-mountable device 100. For example, such sensors can perform facial feature detection, facial movement detection, facial recognition, eye tracking, user mood detection, user emotion detection, voice detection, etc. For example, an eye sensor can optically capture a view of an eye (e.g., pupil) and determine a direction of a gaze of the user. Such eye tracking may be used to determine a location and/or direction of interest. Detection and/or amplification of sound can then be focused if it is received from sources at such a location and/or along such a direction.

Head-mountable device 100 can include a battery 220, which can charge and/or power components of the head-mountable device 100. The battery 220 can also charge and/or power components connected to the head-mountable device 100, such as a portable electronic device 202, as discussed further herein.

The head-mountable device 100 can include an input/output component 226, which can include any suitable component for connecting head-mountable device 100 to other devices. Suitable components can include, for example, audio/video jacks, data connectors, or any additional or alternative input/output components. The input/output component 226 can include buttons, keys, or another feature that can act as a keyboard for operation by the user. As such, the description herein relating to keyboards can apply to keyboards, keys, and/or other input features integrated on the head-mountable device 100. Such an input/output component 226 can be fixedly or removably attached to a main body of the head-mountable device 100.

The head-mountable device 100 can include communications circuitry 228 for communicating with one or more servers or other devices using any suitable communications protocol. For example, communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 228 can also include an antenna for transmitting and receiving electromagnetic signals.

The head-mountable device 100 can include the microphones 230 as described herein. The microphone 230 can be operably connected to the processor 170 for detection of sound levels and communication of detections for further processing, as described further herein.

The head-mountable device 100 can include the speakers 212 as described herein. The speakers 212 can be operably connected to the processor 170 for control of speaker output, including sound levels, as described further herein.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

The head-mountable device 100 can optionally connect to a portable electronic device 202, which can provide certain functions. For the sake of brevity, the portable electronic device 202 will not be described in detail in FIG. 2. It should be appreciated, however, that the portable electronic device 202 may be embodied in a variety of forms including a variety of features, all or some of which can be utilized by the head-mountable device 100 (e.g., input/output, controls, processing, battery, etc.). The portable electronic device 202 can provide a handheld form factor (e.g., small portable electronic device which is light weight, fits in a pocket, etc.). Although not limited to these, examples include media players, phones (including smart phones), PDAs, computers, and the like. The portable electronic device 202 may include a screen 213 for presenting the graphical portion of the media to the user. The screen 213 can be utilized as the primary screen of the head-mountable device 100.

The head-mountable device 100 can include a dock 206 operative to receive the portable electronic device 202. The dock 206 can include a connector (e.g., Lightning, USB, FireWire, power, DVI, etc.), which can be plugged into a complementary connector of the portable electronic device 202. The dock 206 may include features for helping to align the connectors during engagement and for physically coupling the portable electronic device 202 to the head-mountable device 100. For example, the dock 206 may define a cavity for placement of the portable electronic device 202. The dock 206 may also include retaining features for securing portable electronic device 202 within the cavity. The connector on the dock 206 can function as a communication interface between the portable electronic device 202 and the head-mountable device 100.

Figure 3:
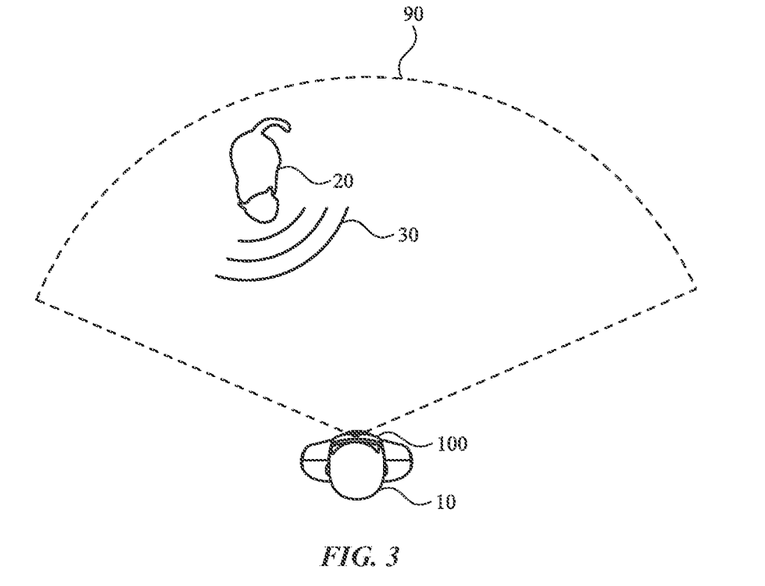
FIG. 3 illustrates a top view of a user wearing a head-mountable device and a source of a sound within a field-of-view of the user, according to some embodiments of the present disclosure.

Referring now to FIG. 3, a user can wear and/or operate a head-mountable device that provides visual outputs based on audio inputs. As shown in FIG. 3, a user 10 can wear the head-mountable device 100, which provides a field-of-view 90 and external environment. A source 20 of a sound 30 can be located within the field-of-view 90. Other sources of sounds can also be located within the field-of-view 90 and/or outside the field-of-view 90. As each of the sounds are received by the user, the head-mountable device 100 can provide visual outputs that guide the user's attention to particular sources of sound.

Figure 4:
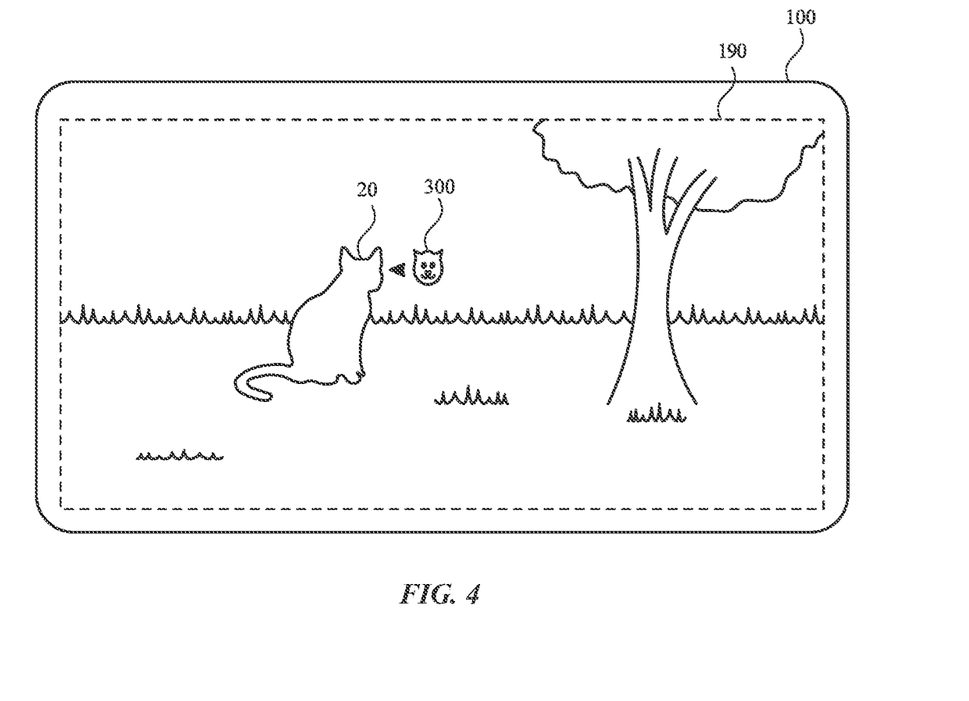
FIG. 4 illustrates a view of the head-mountable device of FIG. 3 providing a visual output, according to some embodiments of the present disclosure.

Referring now to FIG. 4, the display 190 of the head-mountable device 100 can provide a view of the external environment, including a source 20 of the sound. One or more of the displayed items in the view of the display 190 can correspond to physical objects in an environment. For example, a camera of the head-mountable device 100 can capture a view of the external environment. Based on the captured view, the display 190 can provide a display that includes images of the physical objects. Additionally or alternatively, the display 190 can provide a display of virtual objects that correspond to physical objects in the external environment. For example, recognized objects can be rendered as virtual objects having features (e.g., position, orientation, color, size, etc.) that are based on detections of the physical objects in the external environment. Additionally or alternatively, the display 190 can provide a display of virtual objects that do not correspond to physical objects in the external environment. For example, other objects can be rendered as virtual objects even when no corresponding physical objects are present. Accordingly, it will be recognized that the view can include a view of physical objects and virtual objects.

As shown in FIG. 4, the display 190 can identify a source 20 of a detected sound as having a particular location (e.g., direction of origin) with respect to the head-mountable device 100. Such determinations can be performed by an array of microphones, as discussed herein. Upon determination of the location of the source 20, the corresponding location on the display 190 can also be determined based on a known spatial relationship between the microphones and the display 190 of the head-mountable device 100. As further shown in FIG. 4, an indicator 300 can be visually output by the display 190 to indicate the location of the source 20. Such an output can help the user visually identify the location of the source 20 even when the user is unable to directly identify the location-based on the user's own detection of the sound.

The indicator 300 can include an icon, symbol, graphic, text, word, number, character, picture, or other visible feature that can be displayed at, on, and/or near the source 20 as displayed on the display 190. For example, the indicator 300 can correspond to a known characteristic (e.g., identity, name, color, etc.) of the source 20. Additionally or alternatively, the indicator 300 can include visual features such as color, highlighting, glowing, outlines, shadows, or other contrasting features that allow portions thereof to be more distinctly visible when displayed along with the view to the external environment and/or objects therein. The indicator 300 can move across the display 190 as the user moves the head-mountable device to change the field-of-view being captured and/or displayed. For example, the indicator 300 can maintain its position with respect to the source 20 as the source 20 moves within the display 190 due to the user's movement.

Figure 5:
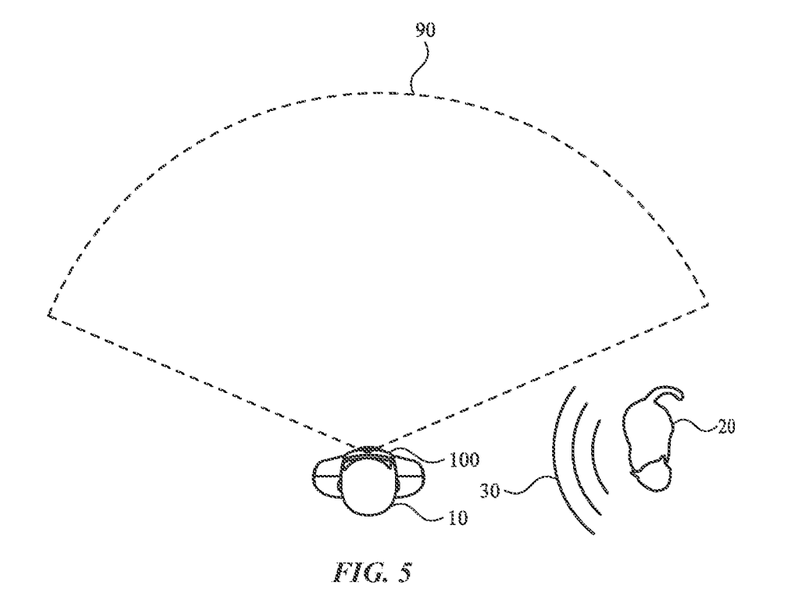
FIG. 5 illustrates a top view of a user wearing a head-mountable device and a source of a sound that is outside a field-of-view of the user, according to some embodiments of the present disclosure.

Referring now to FIG. 5, a source 20 of a sound 30 can be located outside of the field-of-view 90 provided by the head-mountable device 100. Other sources of sounds can also be located within the field-of-view 90 and/or outside the field-of-view 90. As each of the sounds are received by the user, the head-mountable device 100 can provide visual outputs that guide the user's attention to particular sources of sound, even when such sources are outside of the field-of-view.

Figure 6:
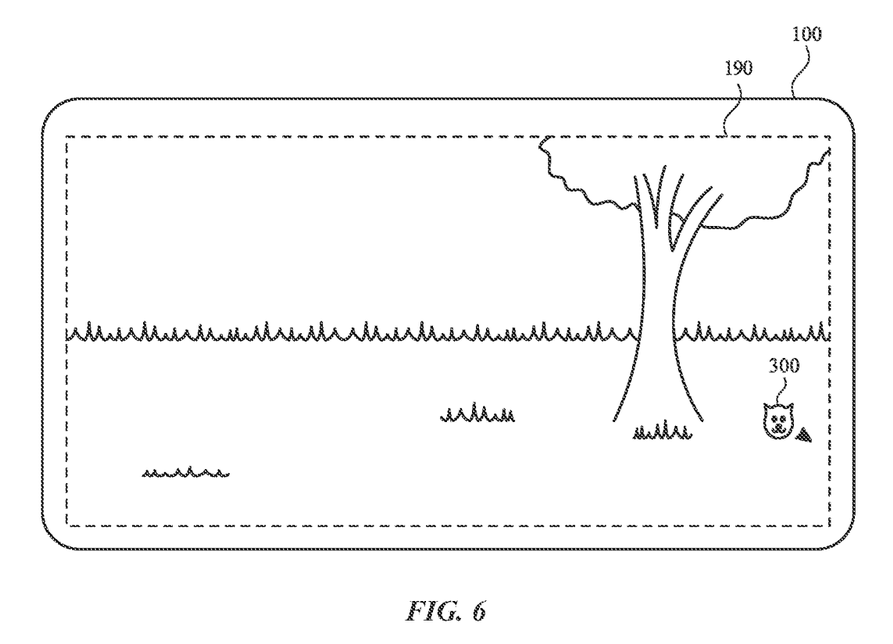
FIG. 6 illustrates a view of the head-mountable device of FIG. 5 providing a visual output, according to some embodiments of the present disclosure.

Referring now to FIG. 6, the display 190 of the head-mountable device 100 can provide a view of the external environment, even when the view does not include the source of the sound. One or more of the displayed items in the view of the display 190 can correspond to physical objects in an environment, as discussed herein. For example, a camera of the head-mountable device 100 can capture a view of the external environment.

As shown in FIG. 6, the display 190 can identify a source of a detected sound as having a particular location (e.g., direction of origin) with respect to the head-mountable device 100. Such determinations can be performed by an array of microphones, as discussed herein. Upon determination of the location of the source 20, it can be further determined that the location of the source is not within a field-of-view provided by the display 190. Such a determination can be made based on a known spatial relationship between the microphones and the display 190 of the head-mountable device 100. As further shown in FIG. 6, the indicator 300 can be visually output by the display 190 to indicate the location of the source even when the source is not displayed within the field-of-view of the display 190. As such, the indicator 300 can suggest to the user the direction in which the user may change its position and/or orientation to capture a view of the source. Such an output can help the user visually identify the location of the source even when the user is unable to directly identify the location-based on the user's own detection of the sound.

The indicator 300 can include an icon, symbol, graphic, text, word, number, character, picture, or other visible feature that can be displayed at, on, and/or near the portion of the display 190 that most closely corresponds to the location of the source. By further example, the indicator 300 can correspond to a known characteristic (e.g., identity, name, color, etc.) of the source. Additionally or alternatively, the indicator 300 can include visual features such as color, highlighting, glowing, outlines, shadows, or other contrasting features that allow portions thereof to be more distinctly visible when displayed along with the view to the external environment and/or objects therein.

The indicator 300 can be provided at a portion of the display 190 that is adjacent to an edge of the display 190. The edge can be one that is closest to where the source would be provided if the field of view were large enough to include it. For example, the indicator 300 can be provided at a portion of the display 190 that is along a pathway extending from a center of the display 190 and in a direction from the center towards the source. By further example, the indicator 300 can indicate a direction in which the user can turn to bring the source within the field-of-view of the display 190. The indicator 300 can updates its position on the display 190 as the user moves the head-mountable device, so that the indicator 300 provides updated suggestions of the direction in which the user can turn to capture the source within the field-of-view of the display 190. Additionally, when the source is brought within the field-of-view of the display 190, the indicator 300 can be provided as shown in FIG. 4.

Figure 7:
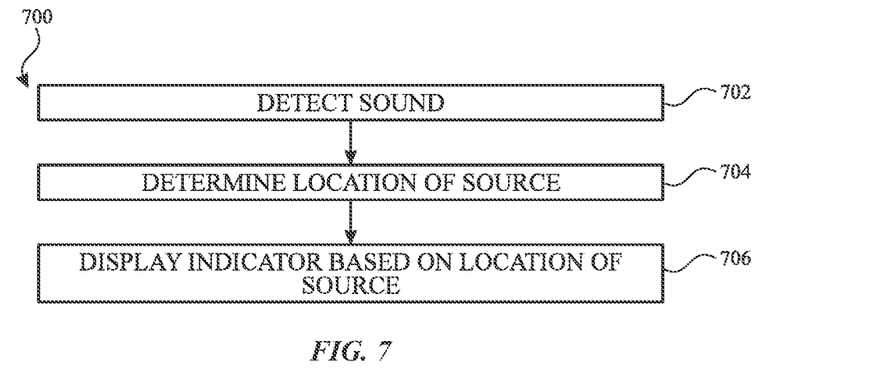
FIG. 7 illustrates a method of operating a head-mountable device to provide audio-based feedback with a display of the head-mountable device, according to some embodiments of the present disclosure.

Referring now to FIG. 7, a method of operating a head-mountable device is provided to achieve the results described herein. The method 700 can be performed at least in part by a head-mountable device to provide audio-based feedback with a display of a head-mountable device. Additionally or alternatively, at least some steps can be performed in part by another device operatively connected to the head-mountable device. It will be understood that the method 700 illustrated in FIG. 7 is merely an example, and that a method can be performed with additional steps and/or fewer steps than those illustrated in FIG. 7.

In operation 702, a head-mountable device detects a sound with one or more microphones. In operation 704, the location of the source of the sound is determined based on operation of the microphones. For example, the microphones can be directional and/or an array of omnidirectional microphones that provide an ability to detect the direction of the source with respect to the head-mountable device. Optionally, the source can be determined to be within or outside a field-of-view of a display of the head-mountable device. In operation 706, and indicator is displayed on a display of the head-mountable device. Where the source is within a field-of-view of the display of the head-mountable device, the indicator can be provided on the display at or near the source as output on the display. Where the source is outside of a field-of-view of the display of the head-mountable device, the indicator can be provided on the display as described herein (e.g., to indicate a direction in which the user can turn to view the source).

Figure 8:
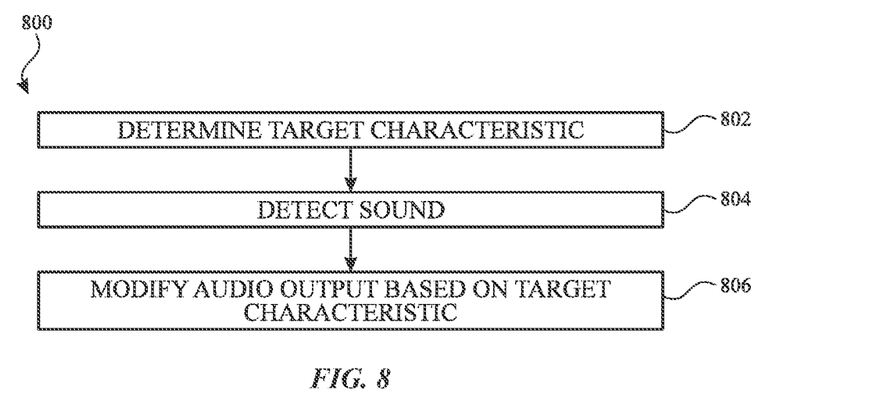
FIG. 8 illustrates a method of operating a head-mountable device to provide audio-based feedback with a speaker of the head-mountable device, according to some embodiments of the present disclosure.

Referring now to FIG. 8, a method of operating a head-mountable device is provided to achieve the results described herein. The method 800 can be performed at least in part by a head-mountable device to provide audio-based feedback with a speaker of a head-mountable device. Additionally or alternatively, at least some steps can be performed in part by another device operatively connected to the head-mountable device. It will be understood that the method 800 illustrated in FIG. 8 is merely an example, and that a method can be performed with additional steps and/or fewer steps than those illustrated in FIG. 8.

In operation 802, a head-mountable device determines a target characteristic of a sound to be detected. The target characteristic can be based on a user input. For example, the target characteristic can be selected (e.g., from a menu) and/or input by a user. The target characteristic can be based on a user input in which the user selects a previously recorded sound to form the basis for analysis of subsequently detected sounds. The target characteristic can be a frequency, volume (e.g., amplitude), location, type of source, and/or range of one or more of the above. For example, a sound of a particular type can be targeted, so that the audio output of the head-mountable device is focused on sounds having such a target characteristic.

In operation 804, the head-mountable device detects a sound with one or more microphones.

In operation 806, the head-mountable device modifies audio output of a speaker thereof based on the target characteristic. For example, the head-mountable device can compare the detected sound with the target characteristic to determine whether the detected sound has the target characteristic. If the detected sound is determined to have the target characteristic, it can be amplified as an output of the speakers. For example, the audio output of the speakers can be controlled to amplify audio input that corresponds to the sounds that have the target characteristic. By further example, audio input received by microphones that are directed to the qualifying sound (e.g., having the target characteristic) can be amplified (e.g., volume increased) and audio input received by microphones that are not directed to the qualifying sound (e.g., lacking the target characteristic) can be reduced (e.g., volume decreased).

The modified audio output can allow a user to focus on audio that satisfies the target characteristic, therefore allowing the user to filter out audio that does not satisfy the target characteristic. Accordingly, the burden on the user to separate multiple sounds is reduced by focusing on sounds of interest.

Figure 9:
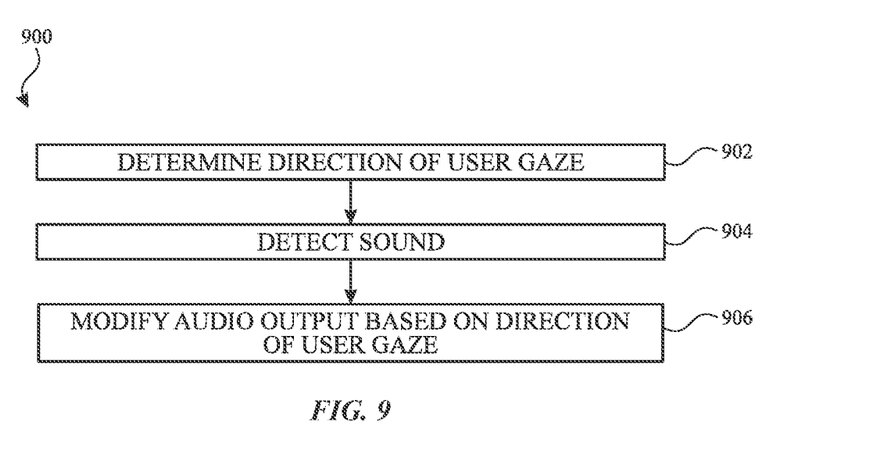
FIG. 9 illustrates a method of operating a head-mountable device to provide audio-based feedback with a speaker of the head-mountable device, according to some embodiments of the present disclosure.

Referring now to FIG. 9, a method of operating a head-mountable device is provided to achieve the results described herein. The method 900 can be performed at least in part by a head-mountable device to provide audio-based feedback with a speaker of a head-mountable device. Additionally or alternatively, at least some steps can be performed in part by another device operatively connected to the head-mountable device. It will be understood that the method 900 illustrated in FIG. 9 is merely an example, and that a method can be performed with additional steps and/or fewer steps than those illustrated in FIG. 9.

In operation 902, a head-mountable device determines a gaze of the user. For example, and eye sensor can be operated to determine the direction in which the user's eye (e.g., pupil) is directed. Such a gaze direction can be understood to indicate the direction of the user's interest, and therefore the locations from which the user desires to hear sounds.

In operation 904, the head-mountable device detects a sound with one or more microphones.

In operation 906, the head-mountable device modifies audio output of a speaker thereof based on the direction of the user's gaze. For example, the head-mountable device can compare the detected sound with the direction of the user's gaze to determine whether the detected sound is from a source that is along the direction of the user's gaze. If the detected sound is determined to be along the direction of the user's gaze, it can be amplified as an output of the speakers. For example, the audio output of the speakers can be controlled to amplify audio input that corresponds to the sounds that are along the direction of the user's gaze. By further example, audio input received by microphones that are directed in the qualifying direction (e.g., the direction of the user's gaze) can be amplified (e.g., volume increased) and audio input received by microphones that are not directed to the qualifying direction (e.g., other than in the direction of the user's gaze) can be reduced (e.g., volume decreased).

The modified audio output can allow a user to indicate the desired audio focus by merely directing the gaze of the eye in the desired direction. Other sounds can be filtered out. Accordingly, the burden on the user to separate multiple sounds is reduced by naturally focusing on sources of interest with eye gaze.

Accordingly, embodiments of the present disclosure provide a head-mountable device with multiple microphones for directional audio detection. The head-mountable device can also include a speaker for audio output and/or a display for visual output. The head-mountable device can be configured to provide visual outputs based on audio inputs by displaying an indicator on a display based on a location of a source of a sound. The head-mountable device can be configured to audio outputs based on audio inputs by modifying an audio output of the speaker based on a detected sound and a target characteristic. Such characteristics can be based on a direction of a gaze of the user, as detected by an eye sensor.

Various examples of aspects of the disclosure are described below as clauses for convenience. These are provided as examples, and do not limit the subject technology.

Clause A: a head-mountable device comprising: multiple microphones; a display; a controller configured to perform the operations of: detecting a sound with the microphones; determining a location of a source of the sound with respect to the head-mountable device; and displaying an indicator on the display based on the location of the source.

Clause B: a head-mountable device comprising: multiple microphones; a speaker; a controller configured to perform the operations of: determining a target characteristic; detecting a sound with the microphones; comparing the sound to the target characteristic; and modifying an audio output of the speaker based on the sound and the target characteristic.

Clause C: a head-mountable device comprising: multiple microphones; a speaker; an eye sensor; a controller configured to: determining a direction of a gaze of a user based on the eye sensor; detecting a sound with the microphones; and modifying an audio output of the speaker based on the sound and the direction of the gaze.

One or more of the above clauses can include one or more of the features described below. It is noted that any of the following clauses may be combined in any combination with each other, and placed into a respective independent clause, e.g., clause A, B, or C.

Clause 1: the location of the source is within a field-of-view provided by the display and the indicator is displayed at a portion of the display that corresponds to the location of the source.

Clause 2: the location of the source is outside a field-of-view of the display and the indicator is displayed at an edge of the display that corresponds to a direction of the location of the source relative to a center of the display.

Clause 3: determining the location of the source of the sound with respect to the head-mountable device comprises determining which one of the microphones is most closely directed toward the location of the source.

Clause 4: the controller is further configured to perform the operation of determining a target characteristic; and determining the location of the source of the sound with respect to the head-mountable device is based on the sound and the target characteristic.

Clause 5: the target characteristic is based on a user input that identifies the sound.

Clause 6: the indicator is based on a characteristic of the source of the sound.

Clause 7: a camera, wherein the display is configured to display a view captured by the camera.

Clause 8: modifying the audio output of the speaker comprises increasing a volume of the audio output that is based on audio input from one of the microphones that is directed toward a location of a source of the sound.

Clause 9: the speaker is one of multiple speakers; and modifying the audio output comprises increasing a volume of one of the speakers that corresponds to a direction that is toward a location of a source of the sound.

Clause 10: the target characteristic is based on a frequency of the sound.

Clause 11: the target characteristic is based on a user input that identifies the sound.

Clause 12: the target characteristic is based on facial recognition of an individual.

Clause 13: determining the direction of the gaze of the user comprises optically capturing a view of an eye of the user with the eye sensor;

Clause 14: modifying the audio output of the speaker comprises increasing a volume of the audio output that is based on audio input from one of the microphones that is directed toward the direction of the gaze.

Clause 15: the controller is further configured to determine that one of the microphones is more closely directed toward the direction of the gaze than others of the microphones; and Clause 16: modifying the audio output of the speaker comprises: increasing a volume of the audio output that is based on audio input from the one of the microphones; and decreasing a volume of the audio output that is based on audio input from the others of the microphones.

Clause 17: a camera; and a display configured to display a view captured by the camera, wherein the direction of the gaze of the user extends through the display.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   multiple microphones;
   a display;
   an eye sensor;
   a speaker; and
   a controller configured to perform operations comprising:
      detecting a sound with the microphones;
      determining a location of a source of the sound with respect to the head-mountable device;
      with the eye sensor, detecting a direction of an eye gaze;
      determining when the location of the source is in the direction of the eye gaze;
      when the location of the source is in the direction of the eye gaze, amplifying the sound with the speaker; and
      while the sound is detected with the microphones and when the location of the source is outside a field-of-view provided by the display, displaying an indicator on the display based on the location of the source.

2. The head-mountable device of claim 1, wherein, when the location of the source is within the field-of-view provided by the display, the indicator is displayed at a portion of the display that corresponds to the location of the source.

3. The head-mountable device of claim 1, wherein the indicator is displayed at an edge of the display that corresponds to a direction of the location of the source relative to a center of the display.

4. The head-mountable device of claim 1, wherein determining the location of the source of the sound with respect to the head-mountable device comprises determining which one of the microphones is most closely directed toward the location of the source.

5. The head-mountable device of claim 1, wherein:
the controller is further configured to determine a target characteristic; and
determining the location of the source of the sound with respect to the head-mountable device is based on the sound and the target characteristic.

6. The head-mountable device of claim 5, wherein the target characteristic is based on a user input that identifies the sound.

7. The head-mountable device of claim 1, wherein the indicator is based on a characteristic of the source of the sound.

8. The head-mountable device of claim 1, further comprising a camera, wherein the display is configured to display a view captured by the camera.

9. A head-mountable device comprising:
multiple microphones;
a camera;
a display configured to display a field-of-view captured by the camera;
an eye sensor configured to detect a direction of an eye gaze;
a speaker; and
a controller configured to perform operations comprising:
detecting a sound with the microphones;
determining whether a source of the sound is located outside the field-of-view of the camera; and
with the eye sensor and when the location of the source is inside the field-of-view provided by the display, detecting when the source of the sound is in the direction of the eye gaze;
when the location of the source is in the direction of the eye gaze, amplifying the sound with the speaker; and
while the sound is detected with the microphones and when the source is located outside the field-of-view of the camera, displaying an indicator on the display based on a location of the source.

10. The head-mountable device of claim 9, wherein, when the location of the source is within the field-of-view of the camera, the indicator is displayed at a portion of the display that corresponds to the location of the source.

11. The head-mountable device of claim 9, wherein when the source is located outside the field-of-view of the camera, the indicator is displayed at an edge of the display that corresponds to a direction of the location of the source relative to a center of the display.

12. The head-mountable device of claim 9, wherein determining the location of the source of the sound with respect to the head-mountable device comprises determining which one of the microphones is most closely directed toward the location of the source.

13. The head-mountable device of claim 9, wherein:
the controller is further configured to determine a target characteristic; and
determining the location of the source of the sound with respect to the head-mountable device is based on the sound and the target characteristic.

14. The head-mountable device of claim 13, wherein the target characteristic is based on a user input that identifies the sound.

15. The head-mountable device of claim 9, wherein the indicator is based on a characteristic of the source of the sound.

16. A head-mountable device comprising:
multiple microphones;
a display;
an eye sensor configured to detect a direction of an eye gaze;
a speaker; and
a controller configured to perform operations comprising:
detecting a sound with the microphones;
determining whether a source of the sound is located outside a field-of-view provided by the display;
while the sound is detected with the microphones and when the location of the source is within the field-of-view provided by the display, outputting a visual indicator at a portion of the display that corresponds to the location of the source and detecting with the eye sensor when the source of the sound is in the direction of the eye gaze; and
when the location of the source is in the direction of the eye gaze, amplifying the sound with the speaker; and
while the sound is detected with the microphones and when the location of the source is outside the field-of-view provided by the display, outputting the visual indicator at an edge of the display that corresponds to a direction of the location of the source relative to a center of the display.

17. The head-mountable device of claim 16, wherein determining the location of the source of the sound with respect to the head-mountable device comprises determining which one of the microphones is most closely directed toward the location of the source.

18. The head-mountable device of claim 16, wherein:
the controller is further configured to determine a target characteristic; and
determining the location of the source of the sound with respect to the head-mountable device is based on the sound and the target characteristic.

19. The head-mountable device of claim 18, wherein the target characteristic is based on a user input that identifies the sound.

20. The head-mountable device of claim 16, further comprising a camera, wherein the field-of-view provided by the display is based on a view captured by the camera.

* * * * *